Figure 1:
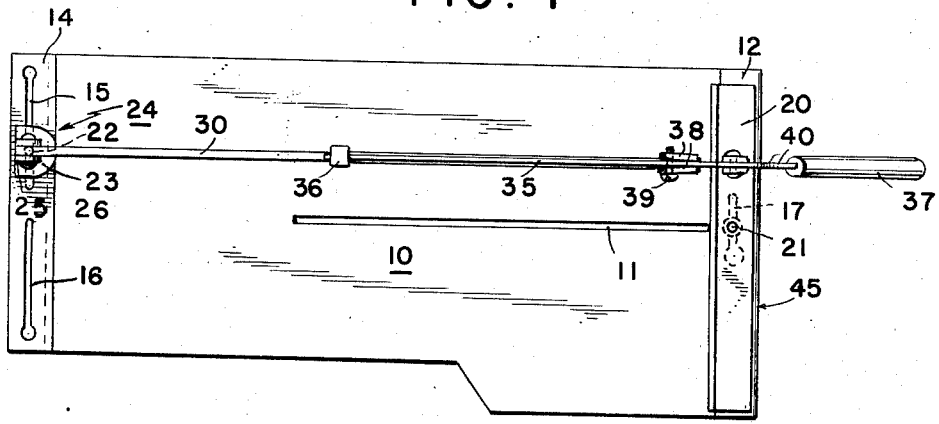

Nov. 19, 1957  C. L. KENNEDY  2,813,559
HOLD DOWN VISE
Filed March 7, 1955

INVENTOR
CHARLES L. KENNEDY

BY *Henry H. Snelling*
ATTORNEY

United States Patent Office 2,813,559
Patented Nov. 19, 1957

2,813,559
HOLD DOWN VISE

Charles L. Kennedy, Columbia, S. C.

Application March 7, 1955, Serial No. 492,499

4 Claims. (Cl. 144—290)

This invention relates to devices for holding work on a work table or other support and has for its principal object the provision of a simple and efficient mechanism for easy and quick clamping of a work piece of any type to a surface such as the table top of a band sawing machine, particularly one which saws metal.

A further object of the invention is to provide a spring pressed arm to engage a work piece on a supporting surface together with a stop member detachably engaged with the surface to prevent movement of the work when engaged by the arm.

Another object of the invention is to provide a spring pressed arm to engage a work piece and having a holding member with rachet teeth to latch the arm resiliently against a work table top or similar supporting surface.

A still further object of the invention is the provision of a spring pressed arm carrying with it means for latching it to a supporting surface, such as a work table pivoted to the table with a high degree of friction so that the arm may be moved out of the way without detaching it from the table and thus making it convenient to move the work to a different position on the table without any interference from the work holder which could be extending vertically upward from its hinge in which case the latching means would lie parallel to the arm.

Figure 2:
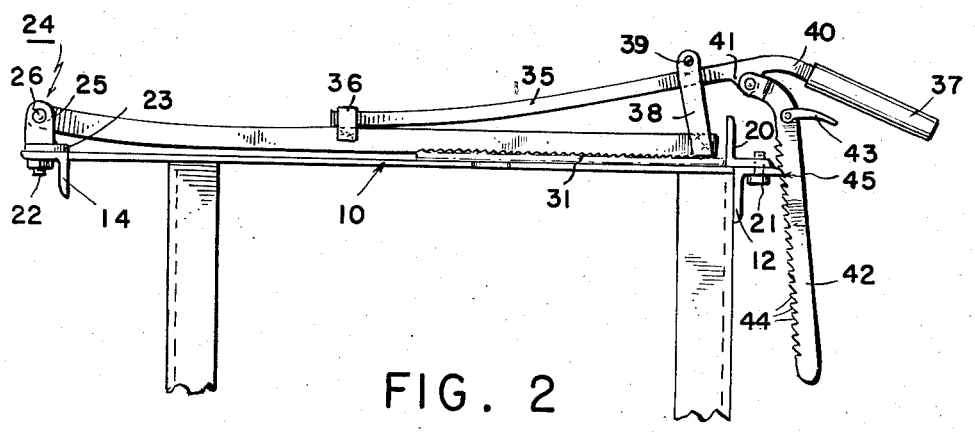

In the drawings:

Figure 1 is a plan view.
Figure 2 is a side elevation.

The vise is illustrated as applied to a work table 10 having a centrally positioned saw slot 11 in which the endless band saw blade (not shown) may be operated. At its front end this table carries an angle iron 12 flush with the table top and at its rear carries a somewhat similar end plate 14. The latter has two keyhole slots 15 and 16 with their entry ends near the side edges of the table. The front end plate has a single keyhole slot 17 located so that its parallel sided portion lies in line with the saw kerf or slot 11. An angle iron stop member 20 at its base carries a stud 21 readily passing into the slot 17. This stud may be a screw but it is not necessary for the stop to have solid engagement with the front end plate 12, which is the forward end of table 10, as its function is to prevent the work from moving forward, that is, moving away from the cutting pressure of the band saw blade as the work is resiliently held downward against the table top.

A stud 22 extending downward from the base 23 of a hinge 24 may enter either slot 15 or 16 in the rear end plate 14, its ears 25 supporting the pivot 26 of the mild steel vise arm 30 which by its fine toothed or grooved or otherwise roughened bottom surface 31 firmly engages the work. As the stud 22 is relatively loose in its slot, the arm 30 may be held parallel to the edge of the table or may be angled across the top to any desired position. The arm 30, however, pivots in the hinge 24 with sufficient friction furnished in any desired manner to enable the arm when moved to an elevated position to remain there usually completely out of the way when not in use, thus avoiding the necessity of slipping the stud 22 out of its bayonet slot.

About one third of the length of the vise arm from its pivot 26 a spring bar 35 is fixedly secured as at 36 by one of its ends to the vise arm, its other end carrying a handle 37. A pair of strips 38 fastened to the free end of the vise arm together with a cap screw 30 form a guide or yoke loosely receiving the spring bar, which preferably is slightly less thick than the vise arm. This arrangement of two parallel metal strips mounted one on the other with their wide sides vertical and their narrow sides partly in contact provides a strong and effective device which is exceptionally narrow overall, permitting the holding of small work pieces close to the band saw blade as such work would be engaged between the yoke 38 and the fastening means 36, neither of which however adds much to the overall width of the vise arm. The vise arm actuating spring bar 35 provides the necessary resilience, as by pressing on the handle 37 more and more of the narrow faces of the two strips 35 and 30 are in contact and the pressure on the work is consequently increased.

Between the handle 37 and the guide or yoke and near the bend 40 the spring bar has a perforated ear 41 in which a ratchet 42 having a finger piece 43 is pivoted so as to be in direct alinement with the vise arm and the major portion of the spring. The teeth 44 on the ratchet engage the sharpened lip 45 on the front end plate 12 as the handle is pressed down and the ratchet is held against the lip by gravity. The ratchet is released by lifting the finger piece away from the lip while sufficient pressure is applied to the handle to release the engagement of the ratchet with the lip of the table end 12.

The operation is as follows:

With the handle 37 raised to move all of the parts of the device about the pivot 26 to a sufficient degree to clear the table top, the work piece is laid on the table and moved against the angle iron stop piece 20. The handle 37 is now lowered and this causes the teeth 31 on the vise arm 30 to engage the work lightly. The ratchet 42 moves lightly by gravity against the lip of the angle iron 12 which is a portion of the table top. Further downward movement of the handle 37 moves the vise arm more firmly against the work piece and this engagement is resilient, the degree of pressure being determined by the amount of pressure applied to the handle. During such further movement the ratchet slips over the holding lip until the desired degree of pressure is obtained.

What I claim is:

1. In combination, a work table having a slotted rear end member and a front member having a lip, a hinge member movable in the slot in the rear end member to turn about a vertical axis, a work holding arm pivoted about a horizontal axis to the hinge member, and a ratchet bar operatively associated with the free end of the work holding arm and engageable with said lip to latch the arm to hold work against the table.

2. In a work holder a hinge member adapted to be detachably secured to a work table, an elongated vise arm rectangular in cross section pivoted at one of its ends to the hinge member with its wider faces vertical, a guide at the other end of the arm, a spring bar rectangular in cross-section secured to the arm between its ends with a portion of the narrow faces of the vise arm and spring bar in contact and loosely engaging the guide, a handle on the free end of the spring bar for pressing the free end of the vise arm toward the work table to hold a work piece on the table, and a holding member pivoted to the spring bar near its handle end and adapted to engage the work table to hold the vise arm in latched position.

3. In combination, a vise arm, a spring bar extending in the same general direction as the vise arm and fixedly secured at one end to the top of the vise arm between the ends thereof to form an acute angle between the vise arm and the spring bar, means for pivoting the vise arm to a support with one end free, and a holding member pivoted to the spring bar beyond the free end of said vise arm for latching the vise arm to said support to resiliently hold a piece of work against the support as the free end of the spring arm is pressed toward the vise arm thereby decreasing said angle and increasing the contact between the vise arm and the spring bar.

4. The combination with a work table having a plurality of keyhole slots therein, of a hinge base having a downwardly extending member to hold the hinge base in any one of said keyhole slots with freedom to pivot readily about said member, a vise arm having a work engaging bottom surface and pivoted at one end to the hinge base to move about a horizontal axis whereby the vise arm may move about a vertical axis through the member and about a horizontal axis through the pivot in the hinge base, a spring bar secured at one end to the work holding vise arm between the ends of the vise arm and extending beyond the free end of the vise arm, and means secured to the spring bar distant from said end for latching the vise arm to the work table.

References Cited in the file of this patent
UNITED STATES PATENTS

| | | |
|---|---|---|
| 1,075,506 | Smith | Oct. 14, 1913 |
| 1,237,071 | McCullough | Aug. 14, 1917 |
| 1,728,718 | Bell | Sept. 17, 1929 |
| 1,905,512 | Shafer | Apr. 25, 1933 |
| 2,554,884 | Smith et al. | May 29, 1951 |

FOREIGN PATENTS

| | | |
|---|---|---|
| 496,404 | Germany | Apr. 23, 1930 |